F. T. HUGHES.
PEDAL EXTENSION.
APPLICATION FILED MAY 6, 1918.
1,293,101. Patented Feb. 4, 1919.
Fig.1.
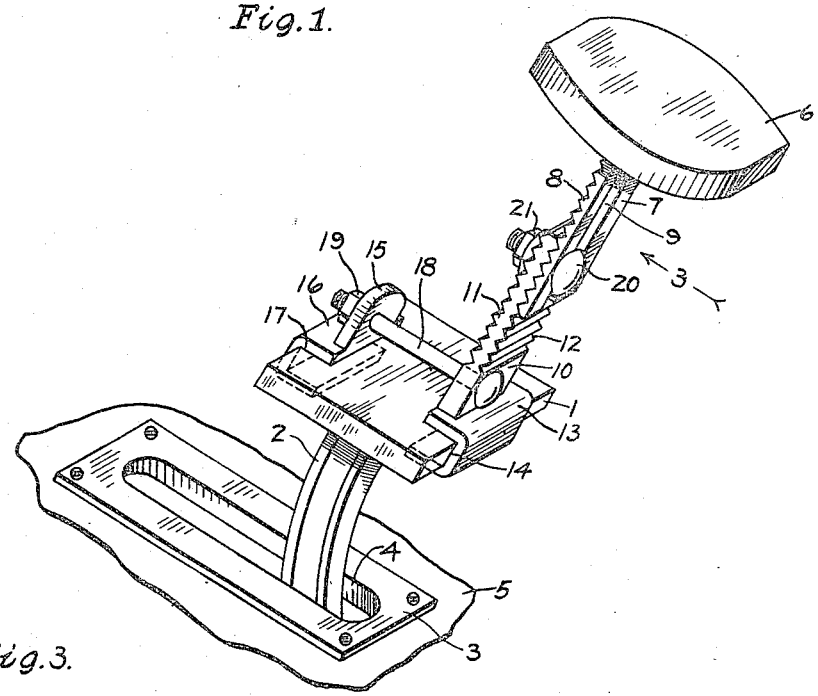
Fig.3.
Fig.2.
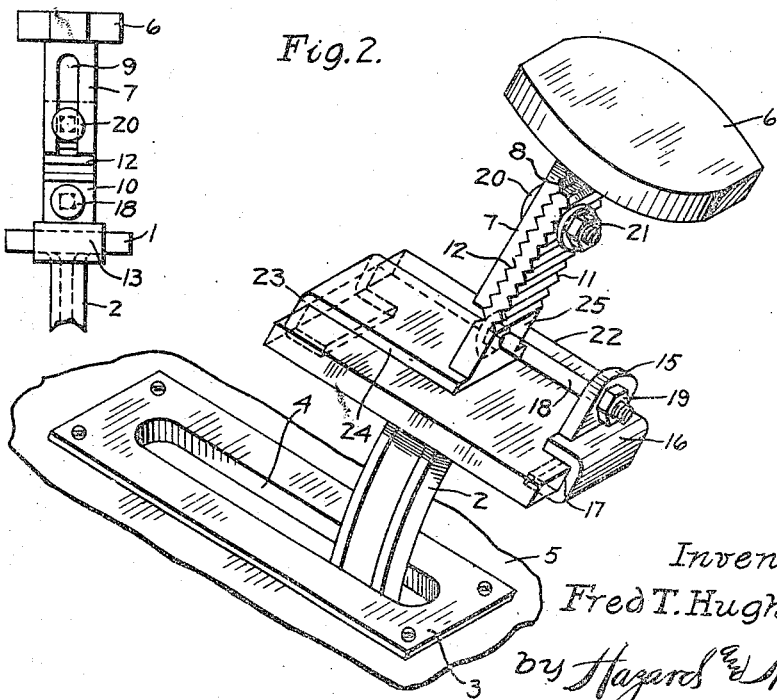
Inventor:
Fred T. Hughes,
by Hazard & Miller
Attys.

UNITED STATES PATENT OFFICE.

FRED T. HUGHES, OF LOS ANGELES, CALIFORNIA, ASSIGNOR OF ONE-HALF TO JOHN J. BANNON, OF LOS ANGELES, CALIFORNIA.

PEDAL EXTENSION.

1,293,101.      Specification of Letters Patent.      Patented Feb. 4, 1919.

Application filed May 6, 1918. Serial No. 232,814.

*To all whom it may concern:*

Be it known that I, FRED T. HUGHES, a citizen of the United States, residing at Los Angeles, in the county of Los Angeles and State of California, have invented new and useful Improvements in Pedal Extensions, of which the following is a specification.

My object is to make an adjustable pedal extension and my invention consists of the novel features herein shown, described and claimed.

Figure 1 is a perspective showing my adjustable pedal extension applied to an automobile pedal ready for use, the extension pedal being shown in its extended position and the automobile pedal being comparatively short from front to back.

Fig. 2 is a view analogous to Fig. 1 and showing the extension pedal in one of its contracted positions and showing the extension pedal applied to an automobile pedal of greater length than in Fig. 1.

Fig. 3 is a fragmentary rear elevation looking in the direction indicated by the arrow 3 in Fig. 1.

The automobile pedal 1 is a plate which may be of various forms mounted upon the pedal lever 2 extending through a plate 3 having a slot 4; the said plate being secured to the floor 5 of the automobile body.

My extension pedal 6 has a rigid shank 7 extending downwardly from its center, and the shank 7 has a horizontally corrugated front face 8 and a vertical slot 9; the slot 9 extending throughout the length of the shank. A supporting post 10 has corrugations 11 and 12 upon its front and rear faces to be engaged by the corrugated front face 8 upon the shank 7. The post 10 is formed integral with the channeled base 13, a channel 14 of the base being adapted to receive the rear end of the pedal plate 1. A clamping post 15 is formed integral with the channel-shaped base 16; said base 16 having a channel 17 adapted to receive the front edge of the pedal plate 1. When the bases 13 and 16 are placed in position upon the pedal plate 1, a clamping bolt 18 is inserted through the lower end of the post 10, and through the post 15, and a nut 19 is placed upon the bolt. Then the extension pedal 6 is adjusted up and down to the desired position, the bolt 20 inserted, and the nut 21 tightened to draw the corrugated front face 8 against the corrugation 12.

In Fig. 2 an automobile pedal plate 22 is considerably longer than the pedal plate 1, and a channel base 23 has an extension plate 24 formed integral with its upper side to carry a post 25 to the center of the pedal plate 22.

In assembling the parts in Fig. 2, the shank 7 is placed against the front face of the supporting post 25 and lower down, simply to show another position of the adjustable extension pedal.

In Fig. 1 the supporting post is at the front or near side of the main pedal plate 1, while in Fig. 2, the supporting post 25 is connected at the rear or far side of the pedal plate 22. It is obvious the channeled bases might be applied to the sides of the pedal plate.

Various changes may be made without departing from the spirit of my invention, as claimed.

I claim:

An adjustable pedal extension comprising, the combination with a regular pedal plate of an extension pedal plate, a rigid shank extending downwardly from the extension pedal plate and having a corrugated face and a vertical slot, a supporting post having corrugated faces, a bolt inserted through the slot and through the supporting post, a channel base formed integral with the lower end of the supporting post and engaging one edge of the regular pedal plate, a second channel base engaging the opposite edge of the regular pedal plate, a clamping post formed integral with the second channel base, and a clamping bolt inserted through the supporting post and through the clamping post to clamp the first channel base upon the regular pedal plate.

In testimony whereof I have signed my name to this specification.

FRED T. HUGHES.